United States Patent
Cox et al.

(10) Patent No.: US 6,792,405 B2
(45) Date of Patent: Sep. 14, 2004

(54) BITSTREAM-BASED FEATURE EXTRACTION METHOD FOR A FRONT-END SPEECH RECOGNIZER

(75) Inventors: Richard Vandervoort Cox, New Providence, NJ (US); Hong Kook Kim, Chatham, NJ (US)

(73) Assignee: AT&T Corp., New York, NY (US)

( * ) Notice: Subject to any disclaimer, the term of this patent is extended or adjusted under 35 U.S.C. 154(b) by 610 days.

(21) Appl. No.: 09/730,435

(22) Filed: Dec. 5, 2000

(65) Prior Publication Data

US 2001/0044718 A1 Nov. 22, 2001

Related U.S. Application Data

(60) Provisional application No. 60/170,170, filed on Dec. 10, 1999.

(51) Int. Cl.⁷ .............................. G10L 15/02; G10L 9/14
(52) U.S. Cl. ...................... 704/236; 704/223; 704/214; 704/219; 381/36
(58) Field of Search .................................. 704/270, 243, 704/238, 236, 229, 223, 221, 219, 200

(56) References Cited

U.S. PATENT DOCUMENTS

| | | | |
|---|---|---|---|
| 4,975,955 A | * | 12/1990 | Taguchi ...................... 704/219 |
| 5,732,389 A | * | 3/1998 | Kroon et al. ................ 704/223 |
| 6,009,383 A | | 12/1999 | Mony |
| 6,009,391 A | | 12/1999 | Asghar et al. |
| 6,067,513 A | | 5/2000 | Ishimitsu |
| 6,078,886 A | | 6/2000 | Dragosh et al. |
| 6,092,039 A | | 7/2000 | Zingher |
| 6,141,641 A | | 10/2000 | Hwang et al. |

OTHER PUBLICATIONS

Barnwell et al., "Speech Coding: A Computer Laboratory Textbook," 1996, John Wiley & Sons, Inc. pp. 85–88, 101–103.*

Kim et al., "Enhanced Distance Measure for LSP–based Speech Recognition," 1993, Electronics Letters, vol. 29, No. 16, pp. 1463–1465.*

Kleijn et al., "Speech Coding and Synthesis," 1995, Elsevier pp. 26–374, 458–462.*

Rabiner et I., "Fundamentals of Speech Recognition," 1993, Prentice Hall, pp. 112–117.*

* cited by examiner

Primary Examiner—Richemond Dorvil
Assistant Examiner—V. Paul Harper

(57) ABSTRACT

A feature extraction process for use in a wireless communication system provides automatic speech recognition based on both spectral envelope and voicing information. The shape of the spectral envelope is used to determine the LSPs of the incoming bitstream and the adaptive gain coefficients and fixed gain coefficients are used to generate the "voiced" and "unvoiced" feature parameter information.

9 Claims, 5 Drawing Sheets

BITSTREAM-BASED FEATURE EXTRACTION METHOD FOR A FRONT-END SPEECH RECOGNIZER

CROSS-REFERENCE TO RELATED APPLICATIONS

This application claims the priority of Provisional Application No. 60/170,170, filed Dec. 10, 1999.

TECHNICAL FIELD

The present invention relates to automatic speech recognition and, more particularly, to a bitstream-based feature extraction process for wireless communication applications.

BACKGROUND OF THE INVENTION

In the provisioning of many new and existing communication services, voice prompts are used to aid the speaker in navigating through the service. In particular, a speech recognizing element is used to guide the dialogue with the user through voice prompts, usually questions aimed at defining which information the user requires. An automatic speech recognizer is used to recognize what is being said and the information is used to control the behavior of the service rendered to the user.

Modern speech recognizers make use of phoneme-based recognition, which relies on phone-based sub-word models to perform speaker-independent recognition over the telephone. In the recognition process, speech "features" are computed for each incoming frame. Modern speech recognizers also have a feature called "rejection". When rejection exists, the recognizer has the ability to indicate that what was uttered does not correspond to any of the words in the lexicon.

The users of wireless communication services expect to have access to all of the services available to the users of land-based wireline systems, and to receive a similar quality of service. The voice-activated services are particularly important to the wireless subscribers since the dial pad is generally away from sight when the subscriber listens to a vocal prompt, or is out of sight when driving a car. With speech recognition, there are virtually no restrictions on mobility, because callers do not have to take their eyes off the road to punch in the keys on the terminal.

Currently, one area of research is focusing on the front-end design for a wireless speech recognition system. In general, many prior art front-end designs fall into one of two categories, as illustrated in FIG. 1. FIG. 1(a) illustrates an arrangement 10 including a speech encoder 12 at the transmitting end, a communication channel 14 (such as a wireless channel) and a speech decoder 16 at the receiving end. The decoded speech is thereafter sent to EAR and also applied as an input to a speech recognition feature extractor 18, where the output from extractor 18 is thereafter applied as an input to an automatic speech recognizer (not shown). In a second arrangement 20 illustrated in FIG. 1(b), a speech recognition feature encoder 22 is used at the transmitting end to allow for the features themselves to be encoded and transmitted over the (wireless) channel 24. The encoded features are then applied as parallel inputs to both a speech decoder 26 and a speech recognition feature extractor 28 at the receiving end, the output from feature extractor 28 thereafter applied as an input to an automatic speech recognizer (not shown). This scheme is particularly useful in Internet access applications. For example, when the mel-frequency cepstral coefficients are compressed at a rate of approximately 4 kbit/s, the automatic speech recognizer (ASR) at the decoder side of the coder exhibits a performance comparable to a conventional wireline ASR system. However, this scheme is not able to generate synthesized speech of the quality produced by the system as shown in FIG. 1(a).

The need remaining in the prior art, therefore, is to provide an ASR front-end whose feature recognition performance is comparable to a wireline ASR and is also able to provide decoded speech of high quality.

SUMMARY OF THE INVENTION

The need remaining in the prior art is addressed by the present invention, which relates to a feature extraction system and method and, more particularly, to a bitstream-based extraction process that converts the quantized spectral information from a speech coder directly into a cepstrum.

In accordance with the present invention, the bitstream of the encoded speech is applied in parallel as inputs to both a front-end speech decoder and feature extractor. The feature parameters consist of both spectral envelope and voicing information. The spectral envelope is derived from the quantized line spectrum pairs (LSPs) followed by conversion to LPC cepstral coefficients. The voiced/unvoiced information is directly obtained from the bits corresponding to adaptive and fixed codebook gains of a speech coder. Thus, the cepstrum is directly converted in the speech decoder from the spectral information bits of the speech coder. The use of both the spectral envelope information and the voiced/unvoiced information yields a front-end feature extractor that is greatly improved over the prior art models.

Other and further features and advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 2:
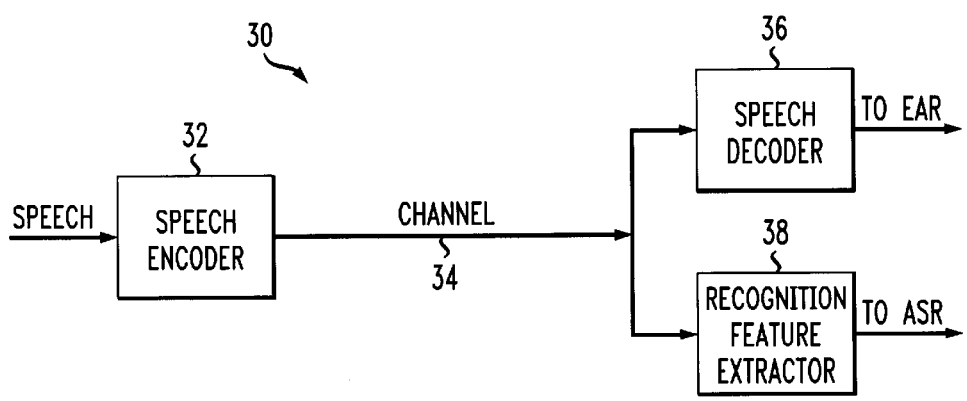
FIG. 2 illustrates, in block diagram form, the components utilized in a speech recognition system of the present invention.

A bitstream-based approach for providing speech recognition in a wireless communication system in accordance with the present invention is illustrated in FIG. 2. As shown, a system 30 utilizes a conventional speech encoder 32 at the transmission end, where for explanatory purposes it will be presumed that an IS-641 speech coder is used, however, various other coders also function reliably in the arrangement of the present invention (in particular, code-excited linear prediction—CELP encoders). The encoded speech thereafter propagates along a (wireless) communication channel 34 and is applied as simultaneous inputs to both a speech decoder 36 and a speech recognition feature extractor 38, where the interaction of these various components will be discussed in detail below.

Figure 3:
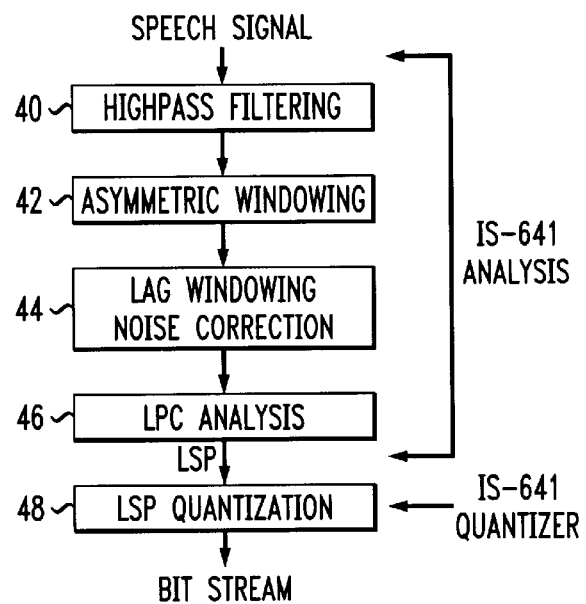
FIG. 3 is a simplified flow chart illustrating the feature extraction process associated with the IS-641 speech coder.

FIG. 3 includes a simplified block diagram of the linear predictive coding (LPC) analysis associated with speech coding performed using an IS-641 speech coder. As shown, the speech coder first removes undesired low frequency components from the speech signal by application of a highpass filter 40 with a cutoff frequency of, for example, 80 Hz. The filtered speech is then applied as an input to an auto-correlation function using an asymmetric window 42, where one side of the window is half of a Hamming window and the other half is a quarter period of the cosine function. The particular shape realized by this asymmetric window is due to the limited lookahead of the speech coder for minimizing the delay for real applications. Subsequent to the windowing, two additional processes 44 are applied to the autocorrelated signal. One is defined as lag-windowing and the other is white noise correction. The former helps to smooth the LPC spectrum so as to exhibit no sharp peaks. The white noise correction provides the effect of adding noise to the speech signal and thus avoids modeling the anti-aliasing filter response at high frequencies with the LPC coefficients. Finally, a conventional LPC recursion is performed (block 46) with the modified autocorrelation sequence output from block 44 to form the line spectrum pair (LSP) coefficient output. A speech encoder 48 then quantizes the LSP coefficients and transmits them as the "bit stream" output to a decoder (not shown). When the LSP coefficients are recovered at the decoder side, the decoded LSP's will be somewhat different from the unquantized LSP's, depending on the performance of the spectral quantizer within speech encoder 48.

Figure 4:
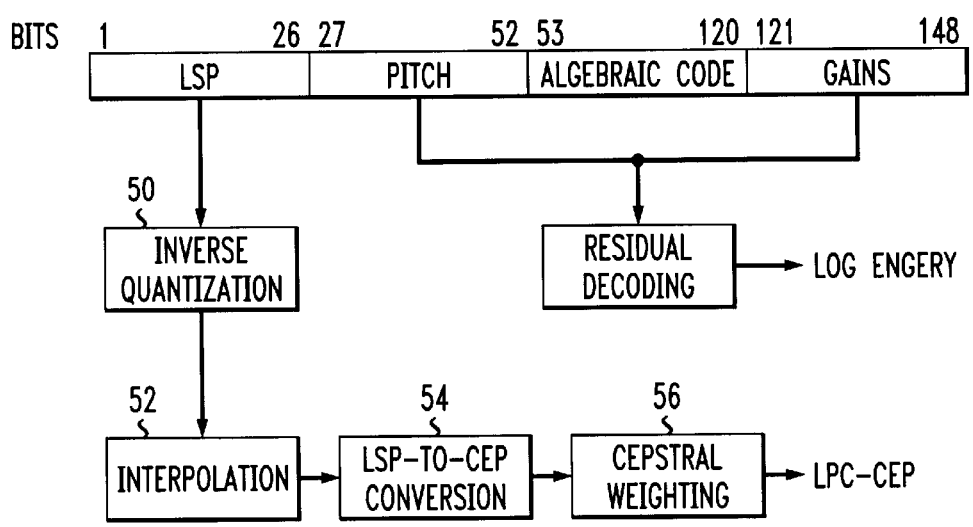
FIG. 4 contains a diagram of the procedure for extracting feature parameters directly from the bitstream in accordance with the present invention.

With this understanding of the encoding process within an IS-641 speech encoder, it is possible to study in detail the bitstream recognition process of the present invention. Referring to FIG. 4, a procedure is illustrated for extracting cepstral coefficients from the bitstream of an IS-641 speech coder (the bitstream being, for example, the output of the arrangement illustrated in FIG. 3). A single frame is illustrated in FIG. 4 and contains two major divisions. As shown, bits 1–26 are used for the LSP quantization while the remaining bits 27–148 are used for all residual information. In the process, the decoded LSP's are decoded from the first 26 bits using a inverse quantizer 50 where, for example, these LSP's represent the spectral envelope of a 30 ms speech segment with a frame rate of 50 Hz. In order to match to the frame rate with that of a conventional speech recognition front-end, the output from inverse quantizer 50 is interpolated with the LSP's of the previous frame (block 52) to convert the frame rate to 100 Hz. Next, cepstral coefficients of order 12 are obtained by performing an LSP to LPC conversion, followed by an LPC to CEP conversion (block 54). By applying a bandpass filter 56 to the cepstral coefficients, a set of twelve weighted coefficients is obtained. The residual signal from bits 27–148, identified as "pitch information" (bits 27–52), "algebraic codebook information" (bits 53–120) and "codebook gains" (bits 121–148), are also decoded. An energy parameters is then computed by taking the logarithm to the square-sum of the residual (20 ms).

Although this description is particular to the IS-641 speech coder, it is to be understood that the feature extraction process of the present invention is suitable for use with any code-excited linear prediction (CELP) speech coder.

Figure 1A:
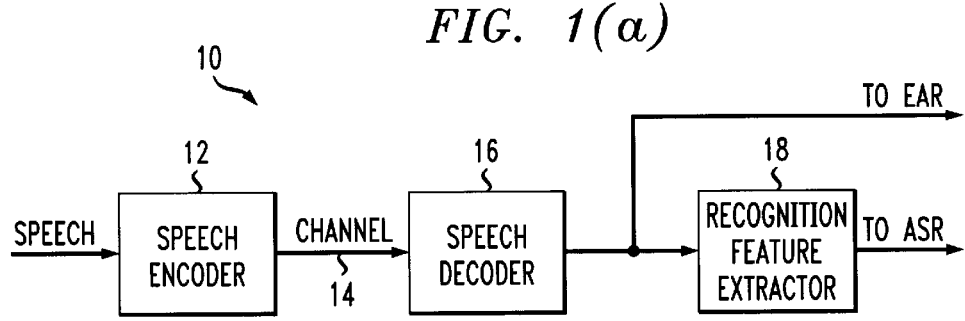
FIGS. 1(a) and (b) illustrate, in simplified block diagram form, two prior arrangements for exemplary wireless automatic speech recognition systems.
Figure 1B:
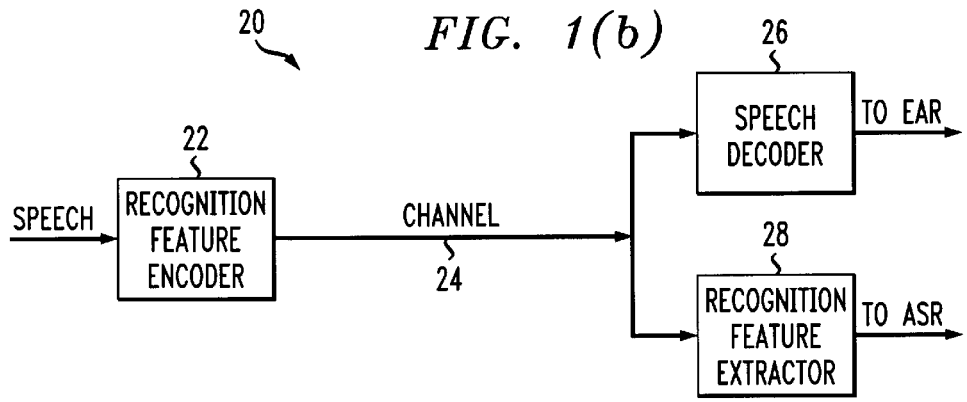
Figure 5:
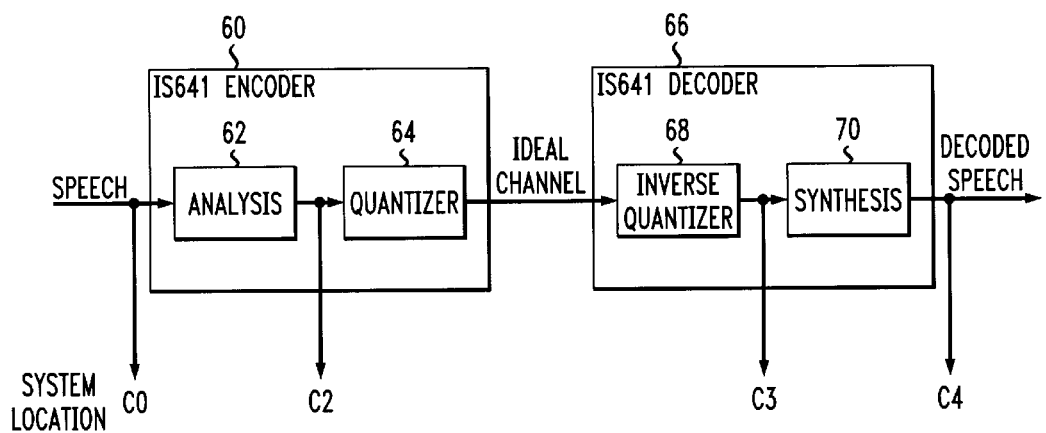
FIG. 5 illustrates an exemplary arrangement for modeling the efficacy of the proposed feature extractor of the present invention when compared with prior art arrangements.

The model illustrated in FIG. 5 can be used to measure the efficacy of the bitstream-based system of the present invention with various other ASR techniques. Illustrated in general is an IS-641 speech encoder 60, including an analysis module 62 and a quantizer 64. An IS-641 speech decoder 66 is also shown, separated from IS-641 speech encoder by an ideal channel 68. Included within speech decoder 66 is an inverse quantizer 68 and a synthesis module 70. A conventional speech signal is applied as an input to analysis module 62 and the decoded speech will ultimately exit from synthesis module 70. The location of reference point C0 corresponds to the placement of a conventional wireline speech recognition system. At reference point C1, ASR is performed on a speech signal coded using IS-641 (corresponding to the arrangement shown in FIG. 1($a$)). In order to evaluate the ASR performance of the LPC analysis method (associated with FIG. 1($b$)), an ASR at location C2 can be used with the unquantized LSP's as generated by LPC recursion process (block 46 of FIG. 3). Lastly, an ASR positioned at location C3 (directly converting the bitstream output of the IS-641 coder into the speech recognition feature set) can then be used to analyze the bitstream-based front end arrangement of the present invention.

Tables I and II below include the speech recognition accuracies for each ASR pair, where "Cx/Cy" is defined as an ASR that is trained in Cx and then tested in Cy:

TABLE I

| Feature | Word Accuracy (%) | Word Error (%) | | | String Accuracy (%) |
| --- | --- | --- | --- | --- | --- |
| | | Sub. | Del. | Ins. | |
| C0/C0 (10 ms) | 96.17 | 1.46 | 0.78 | 1.59 | 68.48 |
| C0/C0 (20 ms) | 95.81 | 1.60 | 0.76 | 1.83 | 66.06 |
| C0/C1 | 95.16 | 2.09 | 0.95 | 1.79 | 62.31 |
| C1/C1 | 94.75 | 2.38 | 1.01 | 1.86 | 60.20 |

TABLE II

| Feature | Word Accuracy (%) | Word Error (%) | | | String Accuracy (%) |
| --- | --- | --- | --- | --- | --- |
| | | Sub. | Del. | Ins. | |
| C2/C2 | 96.23 | 1.43 | 0.71 | 1.63 | 68.91 |
| C3/C3 | 95.81 | 1.68 | 0.82 | 1.69 | 66.48 |

Table I includes a comparison of the recognition accuracy for each of the conventional front-ends, using the ASR location identifiers described above in association with FIG. 5. Alternatively, Table II provides a listing of the recognition accuracy of bitstream-based front-end speech recognition performed in accordance with the present invention as located in either the encoder side or decoder side of the speech coder arrangement. Referring to Table II, comparing the C2/C2 results with the C3/C3 results, it is shown that the word and string accuracies of C3/C3 are decreased by 12% and 8%, respectively (results comparable to C0/C0 with linear interpolation). It has been determined that this degradation is caused mainly by the LSP quantization in the IS-641 speech coder. Therefore, the arrangement of the present invention further requires a method of compensating for the LSP quantization effects. In accordance with the present invention, unvoiced/voiced information is incorporated in the feature set so that the feature set as a whole can compensate for the quantization effect.

Figure 6:
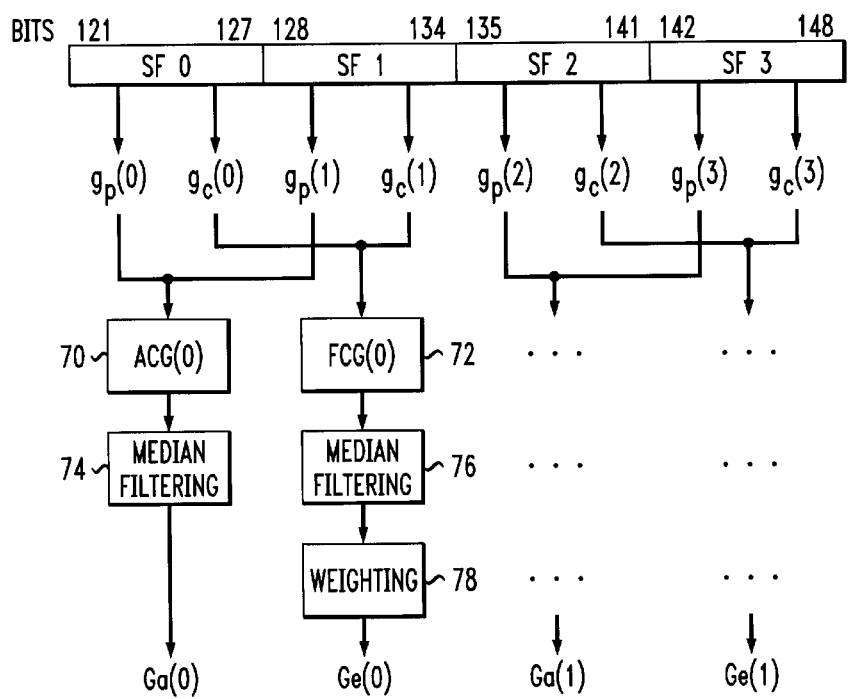
FIG. 6 illustrates a process of the present invention used to obtain additional "voiced" and "unvoiced" information from the bitstream.
Figure 7A:
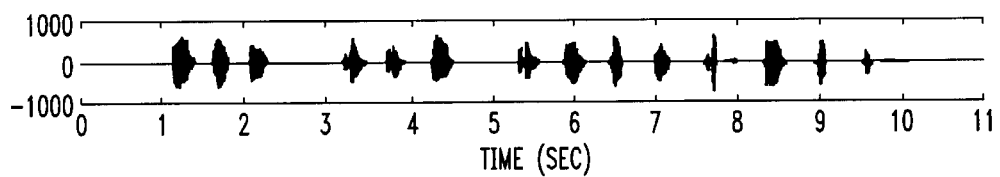
FIG. 7 contains exemplary trajectories of adaptive codebook gain (ACG)—voiced, and fixed codebook gain (FCG)—unvoiced—parameters for speech after processing by an IS-641 speech coder.
Figure 7B:
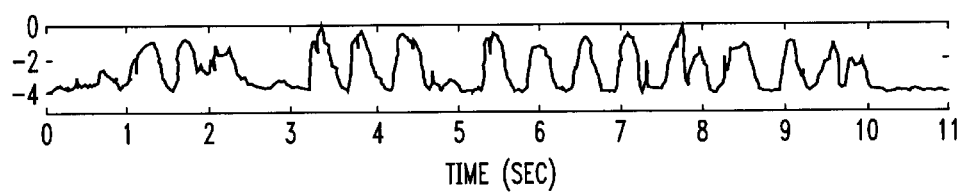
Figure 7C:
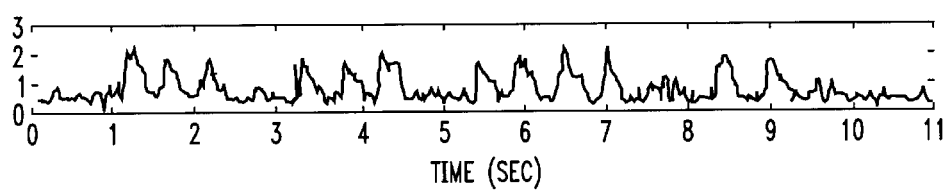
Figure 7D:
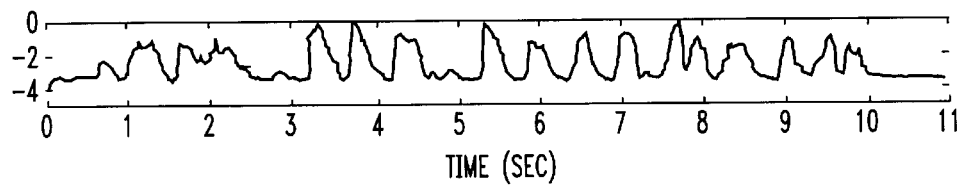

As mentioned above, in addition to the spectral envelope, a speech coder models the excitation signal as the indices and gains of the adaptive and fixed codebooks, where these two gains represent the "voiced" (adaptive codebook gain—ACG) and "unvoiced" (fixed codebook gain—FCG) information. These parameters are quantized and then transmitted to the decoder. Therefore, in accordance with the present invention, it is possible to obtain the voiced/unvoiced information directly from the bitstream. FIG. 6 illustrates an exemplary process of extracting these additional "voiced" and "unvoiced" parameters in the bitstream-based front-end of the invention. As shown, bits 121–148 in an exemplary frame (the "gain" information as shown in FIG. 4) are further divided into four subframes, denoted SF0, SF1, SF2, and SF3, where the ACG (voiced) and FCG (unvoiced) values are computed for each subframe. Therefore, four ACG values and four FCG values are determined for each frame (blocks 70, 72). In order to generate speech recognition feature parameters from these gains, the following equations are used:

$$ACG(i) = \sum_{k=0}^{1} g_p^2(2i+k), \ i = 0, 1 \tag{1}$$

$$FCG(i) = \gamma 10 \log_{10}\left\{\sum_{k=0}^{1} g_c^2(2i+k)\right\}, \ i = 0, 1 \tag{2}$$

where $g_p(i)$ and $g_c(i)$ are defined as the ACG and FCG values of the i-th subframe. In order to add the ACG and FCG values into the feature vector and maintain the same vector dimension as before, two of the twelve LPC cepstra values in the baseline are eliminated.

FIG. 7 illustrates an example of the trajectories of the adaptive codebook gain and fixed codebook gain for a speech waveform after it has been processed by an IS-641 speech coder. FIG. 7(*a*) is an illustration of an exemplary digit string, and FIG. 7(*b*) is the normalized energy parameter associated with this digit string. FIGS. 7(*c*) and 7(*d*) illustrated the ACG and FCG parameters, respectively, for this string. As can be seen, both the ACG and FCG exhibit temporal fluctuations. These fluctuations can be reduced by applying a smoothing technique (such as median filtering, illustrating as blocks 74 and 76 in FIG. 6). As with the typical energy parameters in speech coding, a weighting function (denoted as block 78 in FIG. 6 and defined as γ in Eq. (2)) can be added to the filtered FCG parameters, where the weighting function is chosen to control the effect of the FCG parameters relative to the various other parameters. In one exemplary arrangement, γ may be equal to 0.1.

Table III, included below, illustrates the improved results from incorporating the ACG and FCG parameters into the feature set. Compared with the baseline, the new feature set reduces the word and string error rates by 10% for each. Referring back to Tables I and II, these results for the arrangement of the present technique of incorporating ACG and FCG are now comparable to the conventional prior art models.

TABLE III

| Feature | Word Accuracy (%) | Word Error (%) Sub. | Del. | Ins | String Accuracy (%) |
|---|---|---|---|---|---|
| C3: Wireless Baseline | 95.81 | 1.68 | 0.82 | 1.69 | 66.48 |
| C3-1: LPC-CEP, AFG, FCG | 95.96 | 1.84 | 0.80 | 1.39 | 67.84 |
| C3-2: Median Smoothing | 95.98 | 1.86 | 0.78 | 1.38 | 68.69 |
| C3-3: Gain Scaling | 96.24 | 1.69 | 0.72 | 1.35 | 69.77 |

In order to properly analyze these recognition results, it is possible to use hypothesis tests for analyzing both word accuracy (using matched-pair testing) and string accuracy (using, for example, McNemar's testing). McNemar's testing in the context of speech recognition is discussed in detail in an article entitled *Some statistical issues in the comparison of speech recognition algorithms*", by L. Gillick and S. Cox, appearing in *Proceedings of ICASSP*, p. 532 et seq., May 1989.

For matched-pair testing, the basic premise is to test whether the performance of a system is comparable to another or not. In other words, a hypothesis $H_0$ is constructed as follows:

$$H_0: \mu_A - \mu_B = 0, \tag{3}$$

where $\mu_A$ and $\mu_B$ represent the mean values of the recognition rates for systems A and B, respectively. Alternatively, to test the string accuracy, McNemar's test can be used to test the statistical significance between the two systems. In particular, the following "null" hypothesis is tested: If a string error occurs from one of the two systems, then it is equally likely to be either one of the two. To test this, $N_{01}$ is defined as the number of strings that system A recognizes correctly and system B recognizes incorrectly. Similarly, the term $N_{10}$ will define the number of strings that system A recognizes incorrectly and system B recognizes correctly. Then, the test for McNemar's hypothesis is defined by:

$$W = \frac{|N_{10} - k/2| - 1/2}{\sqrt{k/4}} \tag{4}$$

where $k = N_{01} + N_{10}$.

As an example, these test statistics can be computed for a "wireless baseline" system (C3) and bitstream-based front-end system (C3-3) of the present invention, including both ACG and FCG, using the data from Table III.

TABLE IV

| Features | | Matched-pairs | McNamara |
|---|---|---|---|
| A | B | (W) | (W) |
| C3-3 | C3 | 1.965 | 2.445 |

The results of these computations are shown above in Table IV, where from these results it is clear that the incorporation of ACG and FCG in the arrangement of the present invention provides significantly improved recognition performance over the baseline with a confidence of 95%. Moreover, Table V (shown below) illustrates that the proposed front-end of the present invention yields comparable word and string accuracies to conventional wireline performance.

TABLE V

| Features | | Matched-pairs | McNamara |
|---|---|---|---|
| A | B | (W) | (W) |
| C0 | C1 | 3.619 | 3.607 |
| C3-3 | C1 | 3.914 | 4.388 |
| C3-3 | C0 | 0.328 | 0.833 |

The performance of the bitstream-based front end of a speech recognizer can also be analyzed for a "noisy" environment, such as a car, since oftentimes a wireless phone is used in such noisy conditions. To simulate a noisy environment, a car noise signal can be added to every test digit string. That is, the speech recognition system is trained with "clean" speech signals, then tested with noisy signals. The amount of additive noise can be measured by the segmental signal-to-noise ratio (SNR). Table VI, below, shows the recognition performance comparison when the input SNR varies from 0 dB to 30 dB in steps of 10 dB.

TABLE VI

| SNR(db) | | 0 | 10 | 20 | 30 | ∞ |
|---|---|---|---|---|---|---|
| C0/ | Word | 14.30 | 61.82 | 85.84 | 95.73 | 96.17 |
| C0 | String | 0.0 | 0.51 | 23.07 | 65.49 | 68.48 |
| C0/ | Word | 21.18 | 65.59 | 85.47 | 94.29 | 95.16 |
| C1 | String | 0.0 | 0.51 | 19.96 | 55.75 | 62.32 |
| C3-3 | Word | 16.82 | 67.28 | 90.64 | 95.28 | 96.24 |
| C3-3 | String | 0.0 | 3.62 | 41.59 | 63.79 | 69.77 |

As shown, for an SNR above 20 dB, the bitstream-based front-end arrangement of the present invention (C-3/C-3) shows a better performance than the conventional wireless front end. However, its performance is slightly lower than the conventional wireline front end. With lower values of SNR, the arrangement of the present invention does not compare as favorably, particularly due to the fact that the inventive front-end utilizes voicing information, but the speech coder itself fails to correctly capture the voicing information at low levels of SNR.

Figure 8A:
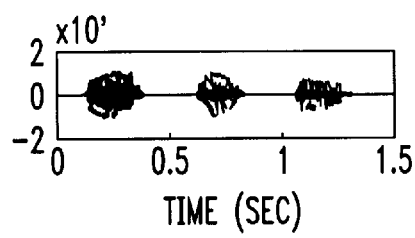
FIG. 8 illustrates various speech waveforms associated with the implementation of an exemplary speech enhancement algorithm in association with the feature extraction process of the present invention.
Figure 8B:
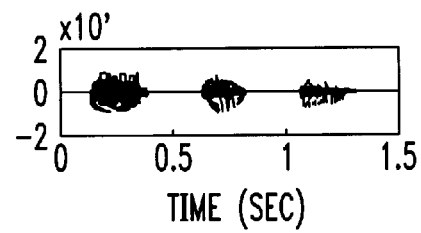
Figure 8C:
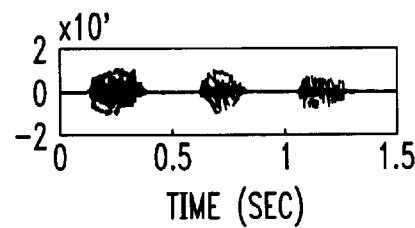
Figure 8D:
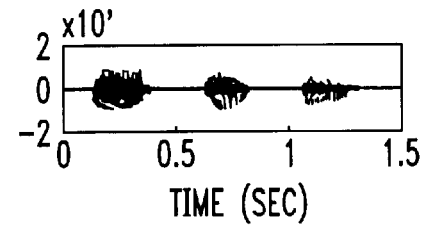
Figure 8E:
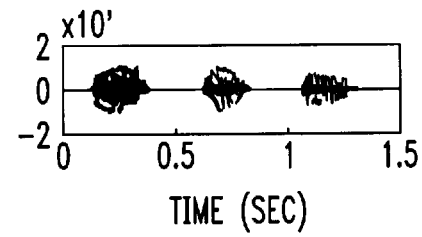
Figure 8F:
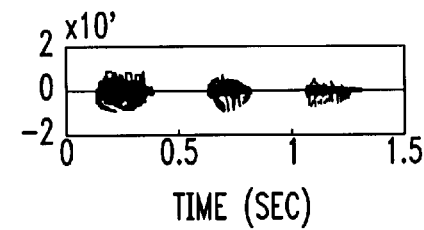

The utilization of a speech enhancement algorithm with the noisy speech signal prior to speech coding, however, has been found to improve the accuracy of the extracted voicing information. An exemplary speech enhancement algorithm that has been found useful with the processing of noisy speech is based on minimum mean-square error log-spectral amplitude estimation and has, in fact, been applied to some standard speech coders. FIG. 8 illustrates speech waveforms implementing such enhancement under a variety of conditions. In particular, a "clean" speech waveform is shown in FIG. 8(a). FIG. 8(b) shows the waveform decoded by a conventional IS-641 speech coder. The "noisy" speech (e.g., contaminated by additive car noise), whose SNR is 20 dB, is shown in FIG. 8(c), and its decoded speech signal is displayed in FIG. 8(d). This particular type of speech enhancement is applied to the "noisy" signal waveform of FIG. 8(e), where the speech coding is then performed after the enhancement, the result being shown in FIG. 8(f), which shows that the noise signal is removed by applying the speech enhancement algorithm.

While the exemplary embodiments of the present invention have been described above in detail, it is to be understood that such description does not limit the scope of the present invention, which may be practiced in a variety of embodiments. Indeed, it will be understood by those skilled in the art that changes in the form and details of the above description may be made therein without departing from the scope and spirit of the invention.

What is claimed is:

1. An automatic speech recognition system for receiving as an input a coded bitstream speech signal and generating therefrom feature recognition parameters, said recognition system including a spectral envelope detection arrangement for generating features derived from line spectrum pair (LSP) information from the encoded bitstream; and an excitation signal extraction arrangement for generating features derived from adaptive codebook gain and fixed codebook gain information related to voiced and unvoiced information, respectively, wherein the bitstream is defined on a frame-by-frame basis, each frame including a first set of bits associated with spectral envelope detection and the LSP coefficients and a second set of bits associated with the excitation signal extraction and the voiced/unvoiced feature parameters, the second set of bits within each frame being divided into subframes, with an adaptive gain coefficient and a fixed gain coefficient calculated for each subframe, the adaptive gain coefficient defined by:

$$ACG(i) = \sum_{k=0}^{1} g_p^2(2i+k), i = 0, 1$$

and the fixed gain coefficient is defined by:

$$FCG(i) = \gamma 10 \log_{10} \left\{ \sum_{k=0}^{1} g_c^2(2i+k) \right\}, i = 0, 1.$$

2. The automatic speech recognition system of claim 1 wherein the spectral envelope detection arrangement comprises an inverse quantizer responsive to the first set of bits in each frame within the bitstream;

an interpolator coupled to the output of the inverse quantizer for providing an output at a predetermined rate;

an LSP-to-CEP conversion unit, responsive to the output of the interpolator to convert the LSP coefficients into CEP coefficients; and a cepstral weighting filter for smoothing the output of said speech recognition system.

3. The automatic speech recognition system of claim 1 wherein $\gamma$ is less than or equal to 0.1.

4. A method of performing feature extraction on a continuous bitstream of encoded speech, the method comprising the steps of:

determining the line spectrum product coefficients from a predetermined set of bits in each frame in the continuous bitstream;

converting the coefficients into spectral envelope information;

determining adaptive codebook gain coefficients and fixed codebook gain coefficients from another set of bits in each frame of said continuous bitstream, wherein in determining the adaptive codebook gain coefficients, the following equation is used:

$$ACG(i) = \sum_{k=0}^{1} g_p^2(2i+k), i = 0, 1; \text{ and}$$

calculating voiced and unvoiced feature information from the adaptive and fixed codebook gain coefficients.

5. The method as defined in claim 4 wherein in determining the line spectrum product coefficients, performing the steps of:

performing an inverse quantization on the predetermined set of bits in each frame; and performing an LSP to CEP conversion on the inverse quantized results.

6. The method as defined in claim 5 wherein in performing the LSP to CEP conversion, the LSP coefficients are first converted to LPC coefficients and the LPC coefficients are converted to CEP coefficients.

7. The method as defined in claim 5 wherein the method comprises the additional step of weighting the CEP coefficients.

8. The method as defined in claim 4 wherein in determining the fixed codebook gain coefficients, the following equation is used:

$$FCG(i) = \gamma 10 \log_{10}\left\{\sum_{k=0}^{1} g_c^2(2i+k)\right\}, i = 0, 1.$$

9. The method as defined in claim 8 wherein $\gamma$ is less than or equal to 0.1.

* * * * *